United States Patent
Terai (10) Patent No.: US 10,781,919 B2
(45) Date of Patent: Sep. 22, 2020

(54) METHOD FOR CONTROLLING CONTINUOUSLY VARIABLE TRANSMISSION AND CONTINUOUSLY VARIABLE TRANSMISSION SYSTEM

(71) Applicant: NISSAN MOTOR CO., LTD., Yokohama-shi, Kanagawa (JP)

(72) Inventor: Hiromu Terai, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/462,690

(22) PCT Filed: Nov. 24, 2016

(86) PCT No.: PCT/JP2016/084829
§ 371 (c)(1),
(2) Date: May 21, 2019

(87) PCT Pub. No.: WO2018/096624
PCT Pub. Date: May 31, 2018

(65) Prior Publication Data
US 2020/0080637 A1    Mar. 12, 2020

(51) Int. Cl.
*F16H 61/00* (2006.01)
*F16H 61/02* (2006.01)
(Continued)

(52) U.S. Cl.
CPC ..... *F16H 61/6646* (2013.01); *F16H 57/0489* (2013.01); *F16H 2061/6607* (2013.01)

(58) Field of Classification Search
CPC ..... F16H 2061/0078; F16H 2061/0081; F16H 2061/0084; F16H 2061/0087; F16H 61/0262; F16H 61/0265
See application file for complete search history.

(56) References Cited

U.S. PATENT DOCUMENTS

2010/0035721 A1    2/2010    Rothenbuhler et al.
2016/0339921 A1*  11/2016    Takahashi ........... B60W 10/026
(Continued)

FOREIGN PATENT DOCUMENTS

JP    2003-343709 A    12/2003
JP    2008-202681 A     9/2008
(Continued)

*Primary Examiner* — Tisha D Lewis
(74) *Attorney, Agent, or Firm* — Foley & Lardner LLP (57) ABSTRACT

A method for controlling a continuously variable transmission including a primary oil chamber, a secondary oil chamber, an oil pump provided in an oil passage between the primary oil chamber and a secondary oil chamber. The method including determining whether a required downshift speed is faster than an allowable value; setting a target piston position of the primary oil chamber; setting a target oil pressure of the primary oil chamber; and increasing priority of a position feedback control based on the target piston position in the setting of the target piston position when it is determined that the downshift speed is slower than the allowable value and increasing priority of a hydraulic feedback control based on the target oil pressure in the setting of the target oil pressure when it is determined that the downshift speed is faster than the allowable value.

5 Claims, 8 Drawing Sheets

(51) Int. Cl.
*F16H 61/664* (2006.01)
*F16H 57/04* (2010.01)
*F16H 61/66* (2006.01)

(56) References Cited

U.S. PATENT DOCUMENTS

| | | | |
|---|---|---|---|
| 2017/0002924 A1* | 1/2017 | Honma | F16H 61/662 |
| 2017/0009877 A1* | 1/2017 | Ichimura | F16H 61/0021 |
| 2017/0138472 A1* | 5/2017 | Tatangelo | F16H 61/662 |
| 2019/0249774 A1* | 8/2019 | Ikeda | F16H 59/46 |

FOREIGN PATENT DOCUMENTS

| | | | |
|---|---|---|---|
| JP | 2008-240894 A | 10/2008 | |
| JP | 2011-208689 A | 10/2011 | |
| JP | 2012-149660 A | 8/2012 | |

* cited by examiner

METHOD FOR CONTROLLING CONTINUOUSLY VARIABLE TRANSMISSION AND CONTINUOUSLY VARIABLE TRANSMISSION SYSTEM

TECHNICAL FIELD

The present invention relates to a method for controlling a continuously variable transmission and a continuously variable transmission system.

BACKGROUND ART

There is disclosed a continuously variable transmission including a hydraulic circuit that includes a first oil pump configured to pump up oil from an oil pan to generate a line pressure and a second oil pump configured to be provided between a primary oil chamber and a secondary oil chamber to adjust the oil in/out to/from a primary oil chamber (e.g., JP2008-240894A).

In such the hydraulic circuit, the second oil pump is interposed in a shifting oil passage that communicates a primary pulley with a secondary pulley and is connected to an oil passage to be a line pressure. Herein, the hydraulic circuit can control a speed ratio by controlling the rotation direction of the second oil pump to adjust the oil in/out to/from the primary oil chamber.

The above document discloses only the shift control of setting a target flow rate of hydraulic oil in accordance with a desired speed ratio and controlling the flow rate of the second oil pump so that the flow rate of the hydraulic oil becomes the target flow rate. For that reason, there is room for consideration of other control from the viewpoint of the suppression of belt slip for example.

SUMMARY OF INVENTION

According to one embodiment of the present invention, a method for controlling a continuously variable transmission, the method controlling in/out of oil to/from a primary oil chamber by using an oil pump provided in an oil passage between the primary oil chamber and a secondary oil chamber. The method includes a determination step of determining whether a required downshift speed is faster than an allowable value; a position control step of setting a target piston position of the primary oil chamber in accordance with an operating state of a vehicle and performing a position control of a piston of the primary oil chamber based on the target piston position; a hydraulic control step of setting a target oil pressure of the primary oil chamber in accordance with the operating state and performing a hydraulic control of the primary oil chamber based on the target oil pressure; and a feedback setting control step of increasing weighting according to a position feedback control based on the target piston position in the position control step when it is determined that the downshift speed is slower than the allowable value in the determination step and of increasing weighting according to a hydraulic feedback control based on the target oil pressure in the hydraulic control step when it is determined that the downshift speed is faster than the allowable value.

DESCRIPTION OF EMBODIMENTS

Hereinafter, exemplary embodiments of the present invention will be explained with reference to the accompanying drawings.

First Embodiment

Figure 1:
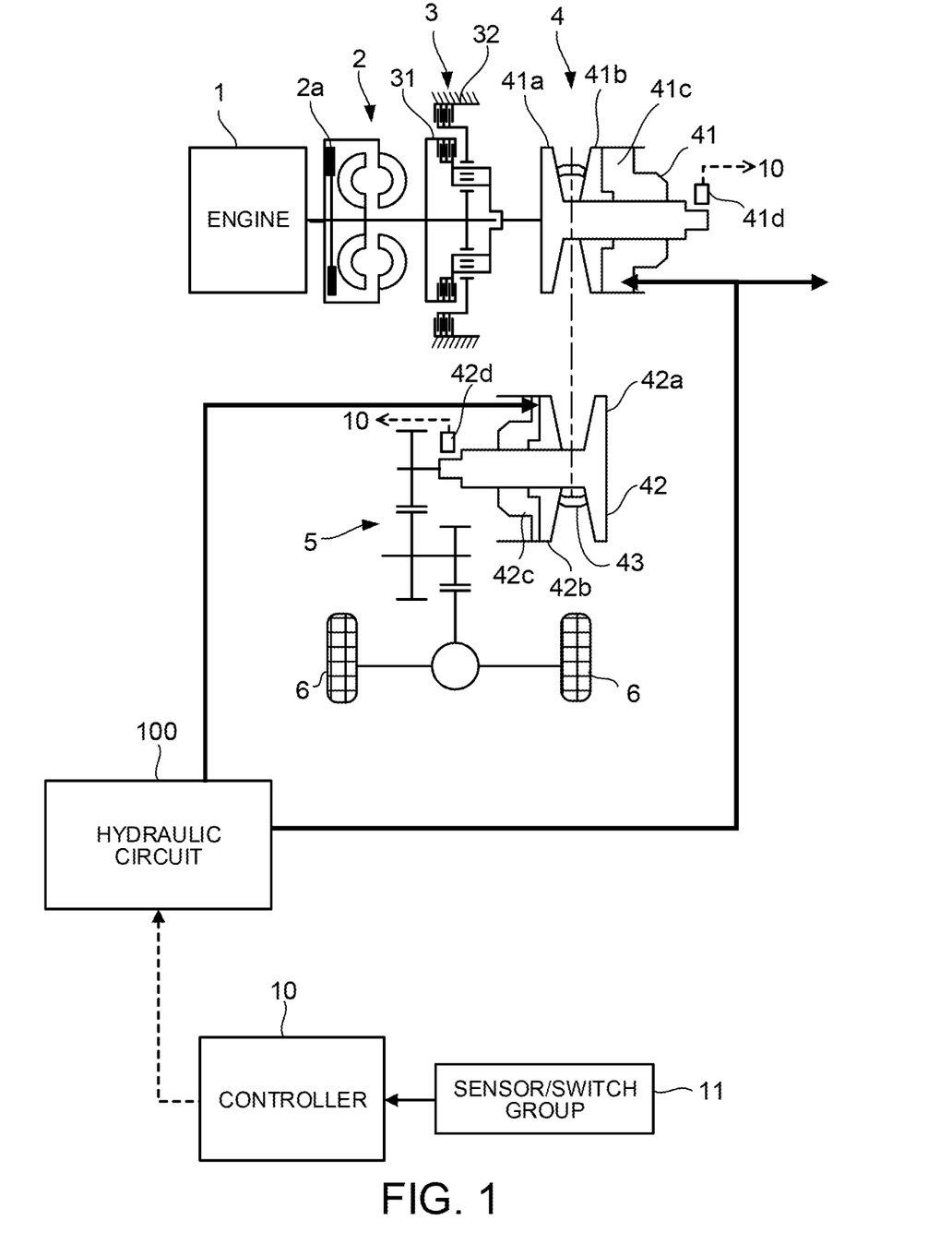
FIG. 1 is a schematic configuration diagram illustrating a vehicle according to a first embodiment.

FIG. 1 is a schematic configuration diagram illustrating a vehicle. The vehicle includes an engine 1, a torque converter 2 with a lock-up clutch 2a, a forward/reverse switching mechanism 3, a variator 4, a final reduction mechanism 5, driving wheels 6, and a hydraulic circuit 100.

The engine 1 constitutes the driving source of the vehicle. The output of the engine 1 is transmitted to the driving wheels 6 via the torque converter 2, the forward/reverse switching mechanism 3, the variator 4, and the final reduction mechanism 5. Therefore, the variator 4 is provided in a power transmission path for transmitting power from the engine 1 to the driving wheels 6, together with the torque converter 2, the forward/reverse switching mechanism 3, and the final reduction mechanism 5.

The forward/reverse switching mechanism 3 is provided between the torque converter 2 and the variator 4 in the above power transmission path. The forward/reverse switching mechanism 3 switches the rotation direction of the input rotation between a forward direction corresponding to forward travel and a reverse direction corresponding to reverse travel.

More specifically, the forward/reverse switching mechanism 3 includes a forward clutch 31 and a reverse brake 32. The forward clutch 31 is engaged when the rotation direction is a forward direction. The reverse brake 32 is engaged when the rotation direction is a reverse direction. The one of the forward clutch 31 and the reverse brake 32 can be configured as a clutch that intermits the rotation between the engine 1 and the variator 4.

The variator 4 includes a primary pulley 41, a secondary pulley 42, and a belt 43 wrapped around the primary pulley 41 and the secondary pulley 42. Hereinafter, primary is also referred to as "PRI" and secondary is also referred to as "SEC". The variator 4 constitutes a belt continuously variable transmission mechanism that changes the wrapping diameters of the belt 43 by changing the groove widths of the PRI pulley 41 and the SEC pulley 42 so as to perform the shift.

The PRI pulley 41 includes a fixed pulley 41a and a movable pulley 41b. A controller 10 activates the movable pulley 41b by controlling the amount of oil to be supplied to a PRI pulley hydraulic chamber 41c so as to change the groove width of the PRI pulley 41.

The SEC pulley 42 includes a fixed pulley 42a and a movable pulley 42b. The controller 10 activates the movable pulley 42b by controlling the amount of oil to be supplied to a SEC pulley hydraulic chamber 42c so as to change the groove width of the SEC pulley 42.

The belt 43 is wrapped around a sheave surface forming a V shape formed by the fixed pulley 41a and the movable pulley 41b of the PRI pulley 41 and a sheave surface forming a V shape formed by the fixed pulley 42a and the movable pulley 42b of the SEC pulley 42.

The final reduction mechanism 5 transmits the output rotation from the variator 4 to the driving wheels 6. The final reduction mechanism 5 is configured to include a plurality of gear trains and a differential gear. The final reduction mechanism 5 rotates the driving wheels 6 via an axle.

The hydraulic circuit 100 supplies an oil pressure to the variator 4, specifically, to the PRI pulley 41 and the SEC pulley 42. The hydraulic circuit 100 also supplies the oil pressure to the forward/reverse switching mechanism 3 and the lock-up clutch 2a, and further to a lubricating system and a cooling system that are not illustrated. The hydraulic circuit 100 is specifically configured as described below.

Figure 2:
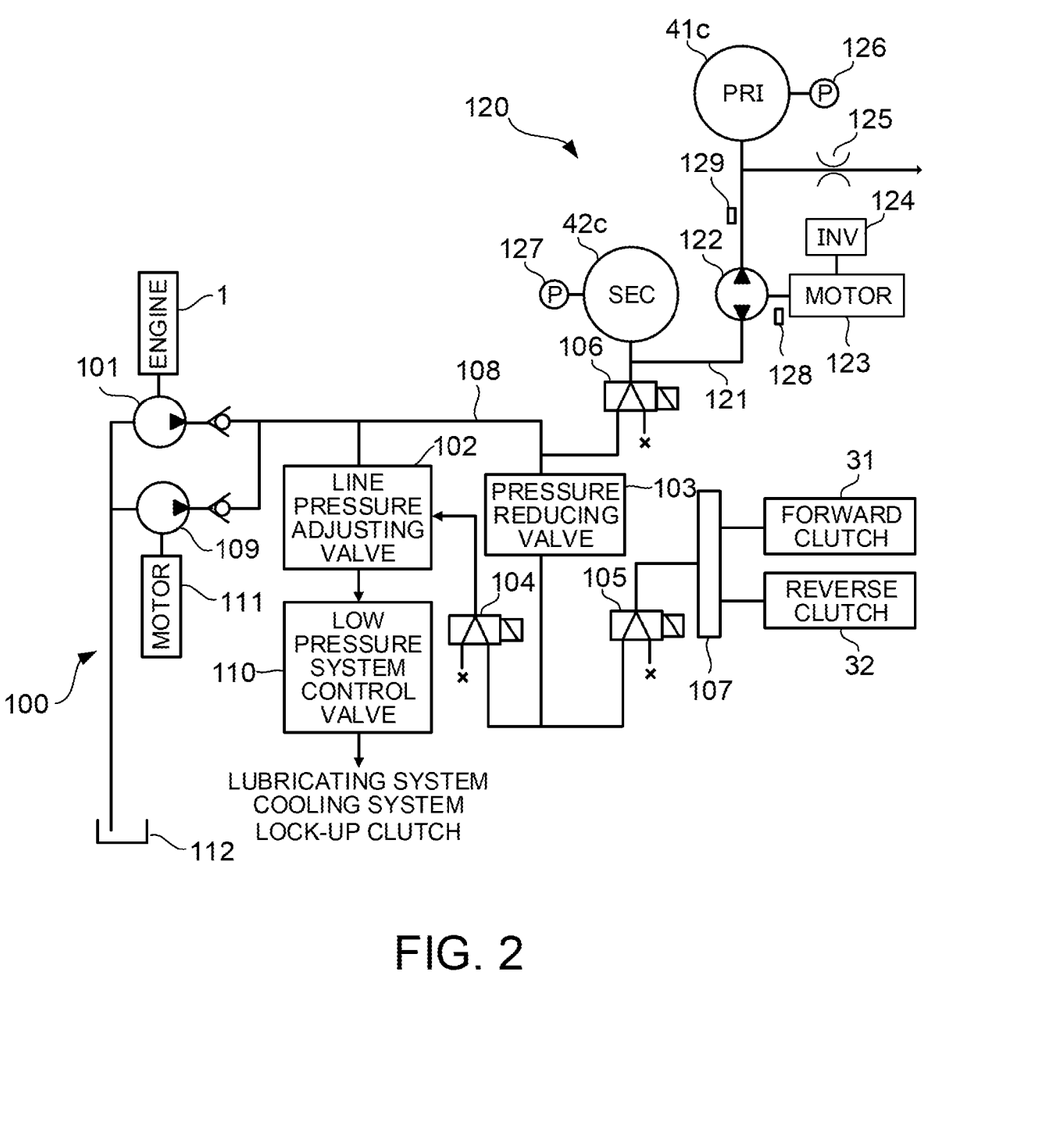
FIG. 2 is a schematic configuration diagram illustrating a hydraulic circuit.

FIG. 2 is a schematic configuration diagram illustrating the hydraulic circuit 100. The hydraulic circuit 100 includes an original pressure oil pump 101, a line pressure adjusting valve 102, a pressure reducing valve 103, a line pressure solenoid valve 104, a forward/reverse switching-mechanism solenoid valve 105, a shifting circuit pressure solenoid valve 106, a manual valve 107, a line pressure oil passage 108, a line-pressure electric oil pump 109, and a low pressure system control valve 110. Hereinafter, a solenoid valve is referred to as "SOL".

The original pressure oil pump 101 is a mechanical oil pump that is driven by the power of the engine 1. The original pressure oil pump 101 is connected to the line pressure adjusting valve 102, the pressure reducing valve 103, and the shifting circuit pressure SOL 106 via the line pressure oil passage 108, and is further connected to a shift circuit 120 via the shifting circuit pressure SOL 106. The line pressure oil passage 108 constitutes the oil passage for line pressure. In addition, a line pressure is an oil pressure acting as the original pressure of the PRI pressure and the SEC pressure.

The line-pressure electric oil pump 109 is driven by an electric motor 111. The line-pressure electric oil pump 109 is activated to supply a line pressure when the engine 1 is stopped by idling/stop control, for example, and the original pressure oil pump 101 is stopped along with this.

The line pressure adjusting valve 102 adjusts the oil pressure generated by the original pressure oil pump 101 to generate a line pressure. That the original pressure oil pump 101 generates the line pressure includes to generate a line pressure under such the action of the line pressure adjusting valve 102. The oil that the line pressure adjusting valve 102 releases during pressure adjustment is supplied to the lock-up clutch 2a, the lubricating system, and the cooling system via the low pressure system control valve 110.

The pressure reducing valve 103 decreases the line pressure. The oil pressure decreased by the pressure reducing valve 103 is supplied to the line pressure SOL 104 and the forward/reverse switching-mechanism SOL 105.

The line pressure SOL 104 is a linear solenoid valve to generate a control oil pressure according to a control current. The control oil pressure generated by the line pressure SOL 104 is supplied to the line pressure adjusting valve 102, and the line pressure adjusting valve 102 operates in accordance with the control oil pressure generated by the line pressure SOL 104 to perform pressure adjustment. For this reason, the command value of a line pressure PL can be set by the control current to the line pressure SOL 104.

The forward/reverse switching-mechanism SOL 105 is a linear solenoid valve to generate an oil pressure according to a control current. The oil pressure generated by the forward/reverse switching-mechanism SOL 105 is supplied to the forward clutch 31 and the reverse brake 32 via the manual valve 107 activated according to the operation of a driver.

The shifting circuit pressure SOL 106 is a linear solenoid valve to generate an oil pressure to be supplied to the shift circuit 120 in accordance with a control current. For this reason, the command value of a shifting circuit pressure can be set by the control current to the shifting circuit pressure SOL 106. The shifting circuit pressure generated by the shifting circuit pressure SOL 106 is supplied to a shifting oil passage 121 of the shift circuit 120. For example, the shifting circuit pressure may be generated by SOL that generates a control oil pressure according to a control current and a pressure control valve that generates a control circuit pressure from the line pressure PL in accordance with the control oil pressure generated by this SOL.

The shift circuit 120 includes the shifting oil passage 121 connected to the line pressure oil passage 108 via the shifting circuit pressure SOL 106 and a shift oil pump 122 interposed in the shifting oil passage 121. The shifting oil passage 121 communicates the PRI pulley hydraulic chamber 41c with the SEC pulley hydraulic chamber 42c.

The shift oil pump 122 is an electrically operated oil pump that is driven by an electric motor 123. The electric motor 123 is controlled by the controller 10 via an inverter 124. The shift oil pump 122 can switch the rotation direction between forward and reverse directions. Herein, the forward direction is a direction to send oil from the SEC pulley hydraulic chamber 42c side to the PRI pulley hydraulic chamber 41c side and the reverse direction is a direction to send oil from the PRI pulley hydraulic chamber 41c side to the SEC pulley hydraulic chamber 42c side.

When the shift oil pump 122 rotates in the forward direction, oil in the shifting oil passage 121 is supplied to the PRI pulley hydraulic chamber 41c. As a result, the movable pulley 41b of the PRI pulley 41 moves in a direction approaching the fixed pulley 41a, and thus the groove width of the PRI pulley 41 is decreased. On the other hand, in the SEC pulley 42, the movable pulley 42b moves in a direction away from the fixed pulley 42a because oil is withdrawn, and thus the groove width of the SEC pulley 42 is increased. In addition, when the shift oil pump 122 rotates in the forward direction, oil is supplied from the line pressure oil passage 108 to the shifting oil passage 121 so that the oil pressure (hereinafter, also referred to as "SEC-side oil pressure") of the shifting oil passage 121 closer to the SEC pulley hydraulic chamber 42c (hereinafter, also referred to as "SEC side") than the shift oil pump 122 does not fall below the command value of the shifting circuit pressure. The command value of the shifting circuit pressure is set in consideration of preventing the slip of the belt 43, for example. In addition, the oil pressure of the shifting oil passage 121 closer to the PRI pulley hydraulic chamber 41c (hereinafter, also referred to as "PRI side") than the shift oil pump 122 is also referred to as a PRI-side oil pressure.

When the shift oil pump 122 rotates in the reverse direction, oil flows out from the PRI pulley hydraulic chamber 41c. As a result, the movable pulley 41b of the PRI pulley 41 moves in a direction away from the fixed pulley 41a, and thus the groove width of the PRI pulley 41 is increased. On the other hand, in the SEC pulley 42, the movable pulley 42b moves in a direction approaching the fixed pulley 42a because oil is supplied, and thus the groove width of the SEC pulley 42 is decreased. Because the oil flowing out from the PRI pulley hydraulic chamber 41c flows into the SEC side, the SEC-side oil pressure is raised. However, the SEC-side oil pressure is controlled not to exceed the command value by the shifting circuit pressure SOL 106. In other words, when the SEC-side oil pressure exceeds the command value, oil is discharged from the shifting oil passage 121 via the shifting circuit pressure SOL 106. On the other hand, when the SEC-side oil pressure is less than the command value, oil flows into from the line pressure oil passage 108 via the shifting circuit pressure SOL 106.

As above, the continuously variable transmission according to the present embodiment performs the shift by controlling the oil in/out to/from the PRI pulley hydraulic chamber 41c by using the shift oil pump 122. The brief of the shift control will be described below.

A branching path branching from between the shift oil pump 122 and the PRI pulley hydraulic chamber 41c is provided in the shifting oil passage 121. Herein, an orifice 125 is provided in the branching path. Oil can be discharged from the orifice 125 to the outside of the shifting oil passage 121. More specifically, the orifice 125 is formed so that its diameter becomes smaller in a portion of the oil passage, and the opposite end of the branching point in the shifting oil passage 121 is opened. Oil continues always leaking out from this open end. When oil is supplied to the PRI pulley hydraulic chamber 41c by the shift oil pump 122, some of oil leaks out from the orifice 125. The oil discharged outside of the shifting oil passage 121 from the orifice is discharged into a space in a case of the continuously variable transmission and is collected in an oil pan 112. As described above, the outside (the tip of the orifice 125) of the shifting oil passage 121 according to the present embodiment is a space. However, the outside (the tip of the orifice 125) of the shifting oil passage 121 may be an oil passage having an oil pressure lower than that of the shifting oil passage 121. In other words, the outside of the shifting oil passage 121 only needs to be a place at which an oil pressure is lower than that of the shifting oil passage 121. In addition, the orifice 125 is an example of an oil discharge mechanism.

Referring again to FIG. 1, the vehicle further includes the controller 10. The controller 10 is an electronic control device and receives signals from a sensor/switch group 11. In addition, the controller 10 is configured by a microcomputer that includes a central processing unit (CPU), a read-only memory (ROM), a random-access memory (RAM), and an input-output interface (I/O interface). The controller 10 may be configured by a plurality of microcomputers.

For example, the sensor/switch group 11 includes an accelerator pedal opening sensor that detects the accelerator pedal opening of the vehicle, a brake sensor that detects the brake pedal force of the vehicle, a vehicle speed sensor that detects a vehicle speed Vsp, and an engine rotation speed sensor that detects a rotation speed NE of the engine 1.

As illustrated in FIG. 2, the sensor/switch group 11 includes a PRI pressure sensor 126 that detects a PRI pressure, a SEC pressure sensor 127 that detects a SEC pressure, a pump rotation speed sensor 128 that detects the rotation speed of the shift oil pump 122, and an oil temperature sensor 129 that detects the temperature of the oil in the shifting oil passage 121. The signals from the sensor/switch group 11 may be input into the controller 10 via another controller, for example. The same is applied to the signals such as information generated by the other controller based on the signals from the sensor/switch group 11.

The controller 10 controls the hydraulic circuit 100 based on the signals from the sensor/switch group 11. More specifically, the controller 10 controls the line pressure SOL 104 and the shift circuit 120 illustrated in FIG. 2. Furthermore, the controller 10 is configured to control the forward/reverse switching-mechanism SOL 105 and the shifting circuit pressure SOL 106.

In controlling the line pressure SOL 104, the controller 10 supplies the control current according to the command value of the line pressure PL to the line pressure SOL 104.

In executing the shift control, the controller 10 sets a target speed ratio based on the signals from the sensor/switch group 11. If the target speed ratio is determined, wrapping diameters (target wrapping diameters) of the pulleys 41 and 42 for realizing the target speed ratio are determined. If the target wrapping diameters are determined, groove widths (target groove widths) of the pulleys 41 and 42 for realizing the target wrapping diameters are determined.

Moreover, in the shift circuit 120, the movable pulley 41b of the PRI pulley 41 moves in accordance with the oil in/out to/from the PRI pulley hydraulic chamber 41c by the shift oil pump 122, and the movable pulley 42b of the SEC pulley 42 also moves according to this. That is to say, the movement amount of the movable pulley 41b of the PRI pulley 41 correlates with the movement amount of the movable pulley 42b of the SEC pulley 42.

Therefore, the controller 10 activates the shift oil pump 122 so that the position of the movable pulley 41b of the PRI pulley 41 becomes a position corresponding to the target speed ratio. The determination of whether the movable pulley 41b is located at a desired position is performed by calculating an actual speed ratio from the detected values of a PRI rotation speed sensor 41d and a SEC rotation speed sensor 42d and determining whether this actual speed ratio is identical with the target speed ratio.

Moreover, that the controller 10 activates the shift oil pump 122 is not limited to the shifting time. Even when the target speed ratio is not changed, the controller 10 activates the shift oil pump 122 when oil leaks out from each of the pulley hydraulic chambers 41c and 42c so as to change the actual speed ratio. In the present embodiment, such the control to maintain the target speed ratio is also included in the shift control.

For that reason, the shift control according to the present embodiment is basically a feedback (FB) control for converging the position of the movable pulley 41b of the PRI pulley 41 on a target position. Herein, the control target of this FB control is not the oil pressures of the pulley hydraulic chambers 41c and 42c but is the groove width of the PRI pulley 41, i.e., the position of the movable pulley 41b. Moreover, the present embodiment is configured to be able to execute the FB control based on the oil pressure of the PRI pulley 41 as well as the FB control based on the position of the movable pulley 41b of the PRI pulley 41.

In addition, a sensor that detects the position of the movable pulley 41b is provided, and this sensor may determine whether the movable pulley 41b is located at a position corresponding to the target speed ratio.

Herein, referring to FIG. 1, a PRI thrust that is a force acting from the PRI pulley 41 and a SEC thrust that is a force acting from the SEC pulley 42 are applied to the belt 43. The PRI thrust is a product of the PRI oil pressure and the cross-sectional area of the PRI pulley 41, and the SEC thrust is a product of the SEC oil pressure and the cross-sectional area of the SEC pulley 42. When the speed ratio of the continuously variable transmission is constant, the PRI thrust is a reaction force whose size is equal to the force transmitted by the SEC thrust via the belt 43.

When the continuously variable transmission downshifts, the PRI pulley 41 moves to the opposite side (right direction in the drawing) to the belt 43, but a relationship between the moving speed of the PRI pulley 41 at that time and a differential thrust FSP obtained by subtracting the PRI thrust from the SEC thrust is expressed by the next equation.

$$FSP = VP/NP \times \text{Constant}$$

Herein, VP is the right moving speed (shift speed) of the PRI pulley 41 and NP is the rotation speed of the PRI pulley 41. In addition, a constant is a value of about 50000.

To shift at a predetermined target shift speed requires a differential thrust corresponding to it. Therefore, when the PRI thrust becomes small to achieve the target shift speed, the PRI thrust falls below the minimum thrust by which belt slip can be suppressed and thus belt slip may occur on the PRI pulley 41 side. In addition, the shift oil pump 122 may be controlled in accordance with operating states such as a target speed ratio and a gain without being limited to a shift speed.

Herein, because the speed ratio itself of the continuously variable transmission is controlled by performing a position FB control of the piston (the movable pulley 41b) of the PRI pulley 41, it is possible to realize high-precision shift control according to the operating state of the vehicle. However, when the position FB control is performed, the control by the PRI pressure is not performed. For that reason, when the target shift speed at the required downshift is fast, it is necessary to increase a differential thrust to quickly change the piston position of the PRI pulley 41. For that reason, because the PRI thrust is controlled to become small, the PRI pressure falls below the required PRI pressure (the required PRI pressure Ppri_e) corresponding to the minimum thrust of preventing belt slip and thus the belt 43 may slip at the PRI pulley 41.

Figure 3:
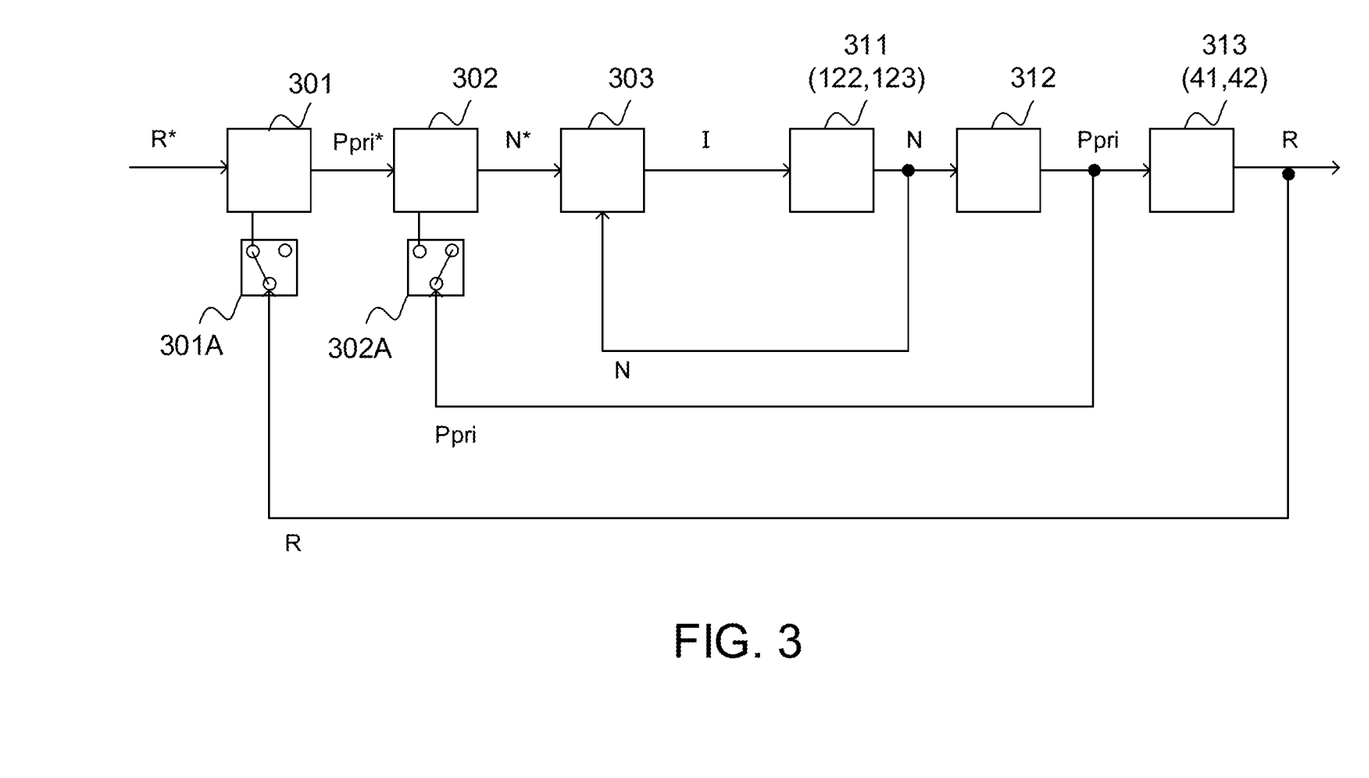
FIG. 3 is a block diagram illustrating the control of an electric motor.

FIG. 3 is a block diagram illustrating the control of the electric motor 123 that is performed by the controller 10 in the present embodiment.

FIG. 3 illustrates a position control unit 301, a hydraulic control unit 302, and a current control unit 303 as control units executed by the controller 10. Based on a command value from the current control unit 303, a first control target 311, a second control target 312, and a third control target 313 are sequentially controlled. These control units and control targets will be explained in detail.

Based on the input of a target speed ratio R* determined in accordance with the operating state of the vehicle such as an accelerator pedal opening, the position control unit 301 calculates a target PRI pressure Ppri* as the command value of the oil pressure for the PRI pulley 41.

Furthermore, a speed ratio R is input into the position control unit 301 via a switch 301A. In addition, the presence and absence of the execution of the position FB control is switched by switching the switch 301A by a control to be described later. The switching between the presence and absence of the input of the speed ratio R is performed based on the switching between ON and OFF of the switch 301A that is performed by the controller 10. In addition, the speed ratio R is calculated from actual rotation speeds of the PRI pulley 41 and the SEC pulley 42.

When the speed ratio R is input (the switch 301A: ON), the position control unit 301 performs the feedback (FB) control based on the speed ratio R with respect to the target speed ratio R* and calculates the target PRI pressure Ppri*. On the other hand, when the speed ratio R is not input (the switch 301A: OFF), the position control unit 301 calculates the target PRI pressure Ppri* without performing such the FB control.

Herein, in the continuously variable transmission that realizes the shift by the oil in/out to/from the PRI pulley 41 by using the shift oil pump 122 as in the present embodiment, the speed ratio is determined in accordance with the piston position in the PRI pulley 41. For that reason, because the piston position correlates with the speed ratio, the FB control based on the speed ratio R is a FB control based on the piston position and thus can be referred to as a position FB control.

Based on the input of the target PRI pressure Ppri* calculated by the position control unit 301, the hydraulic control unit 302 outputs a target rotation speed N* of the electric motor 123.

Furthermore, a PRI pressure Ppri measured by the PRI pressure sensor 126 is input into the hydraulic control unit 302 via a switch 302A. In addition, the presence and absence of the execution of a hydraulic FB control is switched by switching the switch 302A by a control to be described later. The switching between the presence and absence of the input of the PRI pressure Ppri is performed based on the switching between ON and OFF of the switch 302A that is performed by the controller 10.

When the PRI pressure Ppri is input (the switch 302A: ON), the hydraulic control unit 302 performs the hydraulic FB control based on the PRI pressure Ppri with respect to the target PRI pressure Ppri* and calculates the target rotation speed N*. On the other hand, when the target PRI pressure Ppri* is not input (the switch 302A: OFF), the hydraulic control unit 302 calculates the target PRI pressure Ppri* without performing the hydraulic FB control.

The target rotation speed N* calculated by the hydraulic control unit 302 and the rotation speed N of the electric shift oil pump are input into the current control unit 303. Then, the current control unit 303 performs a rotation-speed FB control based on the rotation speed N with respect to the target rotation speed N* and calculates a target current I* for the electric motor 123.

The first control target 311 corresponds to the shift oil pump 122 and the electric motor 123. In the first control target 311, the electric motor 123 operates in accordance with the input of the target current I* calculated by the current control unit 303 and the rotation speed N of the shift oil pump 122 due to its rotation is obtained as an output value.

More specifically, in the first control target 311, an operation is performed based on a current limit value in the electric motor 123, the characteristic of a coil of the electric motor 123, the temperature characteristic of the electric motor 123, the work rate or mechanical loss in the shift oil pump 122, and the like. In addition, the rotation speed N of the shift oil pump 122 that is an output value is acquired by the pump rotation speed sensor 128, and is output to the second control target 312 and is also output to the current control unit 303. In addition, because a current flowing in the electric motor 123 is an alternating current, the current limiting means to limit the absolute value of an alternating current.

The second control target 312 corresponds to the shifting oil passage 121. In the second control target 312, the oil in/out using the shift oil pump 122 is controlled in accordance with the input value of the rotation speed N from the first control target 311, and the PRI pressure Ppri is obtained as an output value.

More specifically, in the second control target 312, the PRI pressure Ppri is controlled based on the specific discharge amount of the shift oil pump 122, a loss in the shift oil pump 122, a leak amount in the PRI circuit, and the like. In addition, the PRI pressure Ppri is acquired by the PRI pressure sensor 126, and is output to the third control target 313 and is also output to the hydraulic control unit 302.

The third control target 313 corresponds to the PRI pulley 41. In the third control target 313, the PRI pulley 41 operates in accordance with the input value of the PRI pressure Ppri, and thus the speed ratio of the continuously variable transmission is controlled and the speed ratio R is obtained as an output value. In the third control target 313, the speed ratio R is determined based on the transmission ratio of a torque to the belt 43, the work rates of the PRI pulley 41 and the SEC pulley 42, and the like.

The rotation speed of the PRI pulley 41 and the rotation speed of the SEC pulley 42 may be acquired by rotation speed sensors (not illustrated) provided in the PRI pulley 41 and the SEC pulley 42 to calculate the speed ratio R in accordance with a ratio between these rotation speeds. When a sensor for detecting the position of the movable pulley 41b is provided, the speed ratio R may be calculated in accordance with the position of the movable pulley 41b detected by the position sensor. The calculated speed ratio R is input into the position control unit 301.

Figure 4:
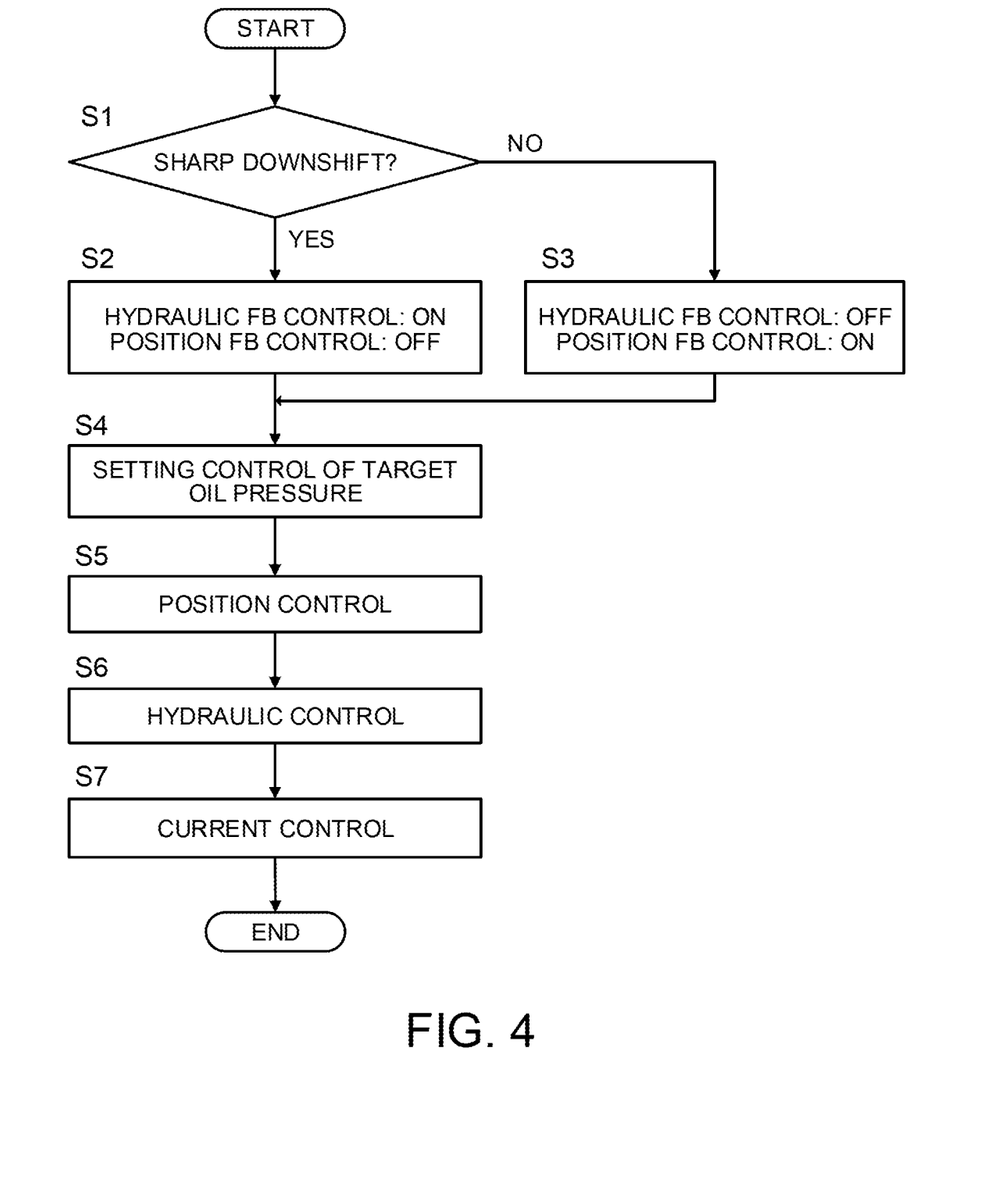
FIG. 4 is a flowchart illustrating a hydraulic control.

FIG. 4 is a flowchart illustrating the hydraulic control according to the present embodiment.

In Step S1, the controller 10 executes a determination step to determine whether sharp downshift is performed. Specifically, the controller 10 determines whether an accelerator pedal opening is larger than a predetermined threshold or whether the depression amount of a brake pedal is larger than a predetermined threshold. More specifically, when the accelerator pedal opening is larger than the predetermined threshold or when the depression amount of the brake pedal is larger than the predetermined threshold and a downshift speed exceeds an allowable threshold, the controller determines that the sharp downshift is performed. In addition, the accelerator pedal opening and the depression amount of the brake pedal used for the determination are parameters indicating the operating states.

When it is determined that the sharp downshift is performed (S1: Yes), the controller 10 determines that it is necessary to perform the hydraulic FB control and proceeds to the process of Step S2. When the sharp downshift is not performed (S1: No), the controller 10 determines that it is necessary to perform the position FB control and proceeds to the process of Step S3.

In Step S2, the controller 10 executes a FB setting control step to switch off the switch 301A so that the position control unit 301 does not perform the position FB control. In addition, the controller 10 switches on the switch 302A to make the hydraulic control unit 302 perform the hydraulic FB control based on the PRI pressure Ppri. After this state is reached, the controller proceeds to the process of Step S4.

In Step S3, the controller 10 executes the FB setting control step to switch on the switch 301A so that the position control unit 301 performs the position FB control based on the speed ratio R. In addition, the controller 10 switches off the switch 302A to cause the hydraulic control unit 302 not to perform the position FB control. After this state is reached, the controller proceeds to the process of Step S4.

In Step S4, the controller 10 performs the setting control of a target oil pressure to calculate the target PRI pressure Ppri* for the PRI pulley 41 and a target SEC pressure Psec* for the SEC pulley 42. The details of the setting control of the target oil pressure will be explained later with reference to FIG. 5.

In Step S5, as illustrated in FIG. 3, the position control unit 301 performs the position control based on the target speed ratio R* to calculate the target PRI pressure Ppri*. The presence or absence of the execution of the position FB control in the position control unit 301 depends on the setting of the switch 301A.

In Step S6, the hydraulic control unit 302 performs the hydraulic control based on the target PRI pressure Ppri* to calculate the target rotation speed N*. The presence or absence of the execution of the hydraulic FB control in the hydraulic control unit 302 depends on the setting of the switch 302A.

In Step S7, the current control unit 303 performs the current control based on the target rotation speed N* to calculate the target current I* flowing into the electric motor 123.

Figure 5:
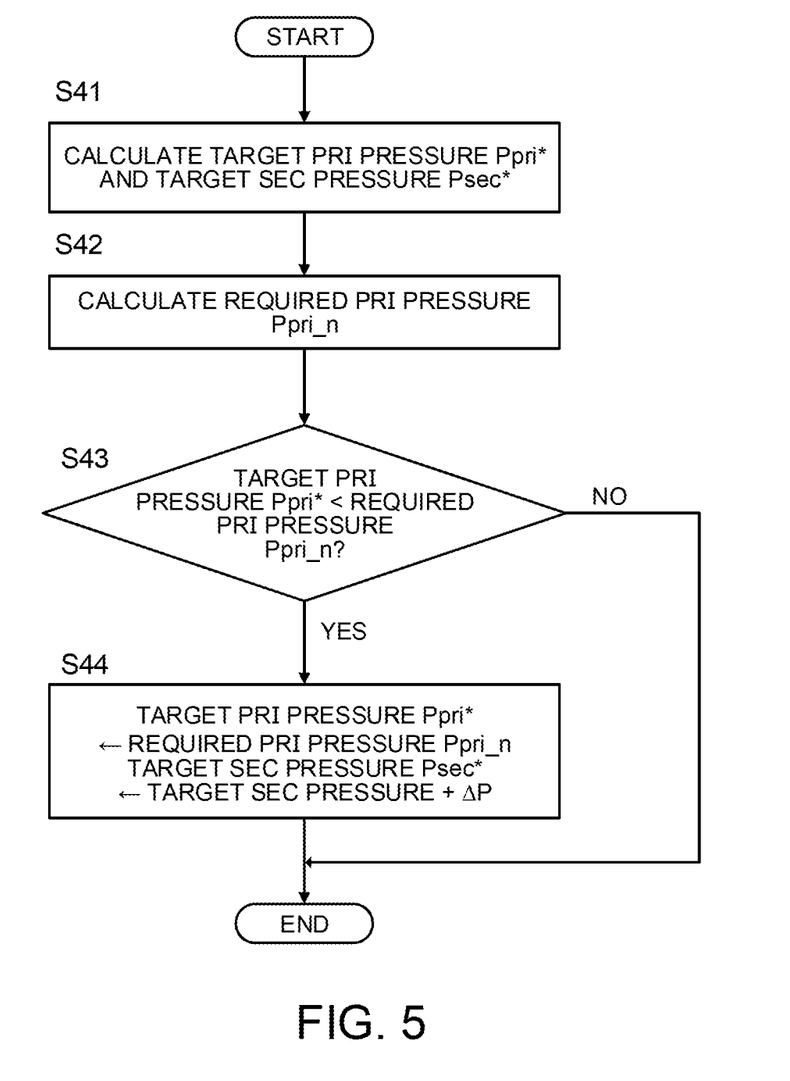
FIG. 5 is a flowchart illustrating a setting control.

FIG. 5 is a flowchart illustrating the setting control of the target oil pressure of Step S4 illustrated in FIG. 4.

In Step S41, the controller 10 calculates the target PRI pressure Ppri* in accordance with a requested shift speed. When the gear is changed to the low side, the target PRI pressure Ppri* is set to a value smaller than the present value and a smaller value is set as the shift speed is faster. When the gear is shifted to the high side, the target PRI pressure Ppri* is set to a value larger than the present value and a larger value is set as the shift speed is faster. As described above, the target PRI pressure Ppri* is obtained in accordance with the change direction and shift speed of the gear, and is specifically calculated by using the previously computed table.

In addition, the controller 10 sets the target SEC pressure Psec* so that the belt is held at the SEC pulley 42. When the target PRI pressure Ppri* and the target SEC pressure Psec* are set, the controller next proceeds to the process of Step S42.

In Step S42, the controller 10 determines a lower limit pressure, at which the belt slip does not occur at the PRI pulley 41, as a required PRI pressure Ppri_n. The required PRI pressure Ppri_n is determined in accordance with the operating state, and is specifically set by using a table etc. that are previously obtained by an experiment etc. When the required PRI pressure Ppri_n is determined, the controller next proceeds to the process of Step S43.

In Step S43, the controller 10 determines whether the target PRI pressure Ppri* falls below the required PRI pressure Ppri_n. When the target PRI pressure Ppri* is equal to or more than the required PRI pressure Ppri_n (S43: No), the controller 10 determines that there is no possibility of the belt slip and terminates the setting control of the target oil pressure. On the other hand, when the target PRI pressure Ppri* falls below the required PRI pressure Ppri_n (S43: Yes), the controller 10 determine that the belt slip may occur and proceeds to the process of Step S44 to change the target PRI pressure Ppri* and the target SEC pressure Psec*.

In Step S44, the controller 10 sets the required PRI pressure Ppri_n as the target PRI pressure Ppri*. At the same time, the controller 10 calculates a deviation ΔP obtained by subtracting the target PRI pressure Ppri* from the required PRI pressure Ppri_n and sets a value obtained by adding the deviation ΔP to the present SEC pressure Psec as the target SEC pressure Psec*.

The processes from Steps S5 to S7 illustrated in FIG. 4 are performed based on the target PRI pressure Ppri* calculated in this way. Furthermore, although it is not illustrated in FIG. 4, the SEC pulley 42 is controlled based on the target SEC pressure Psec*.

Figure 6:
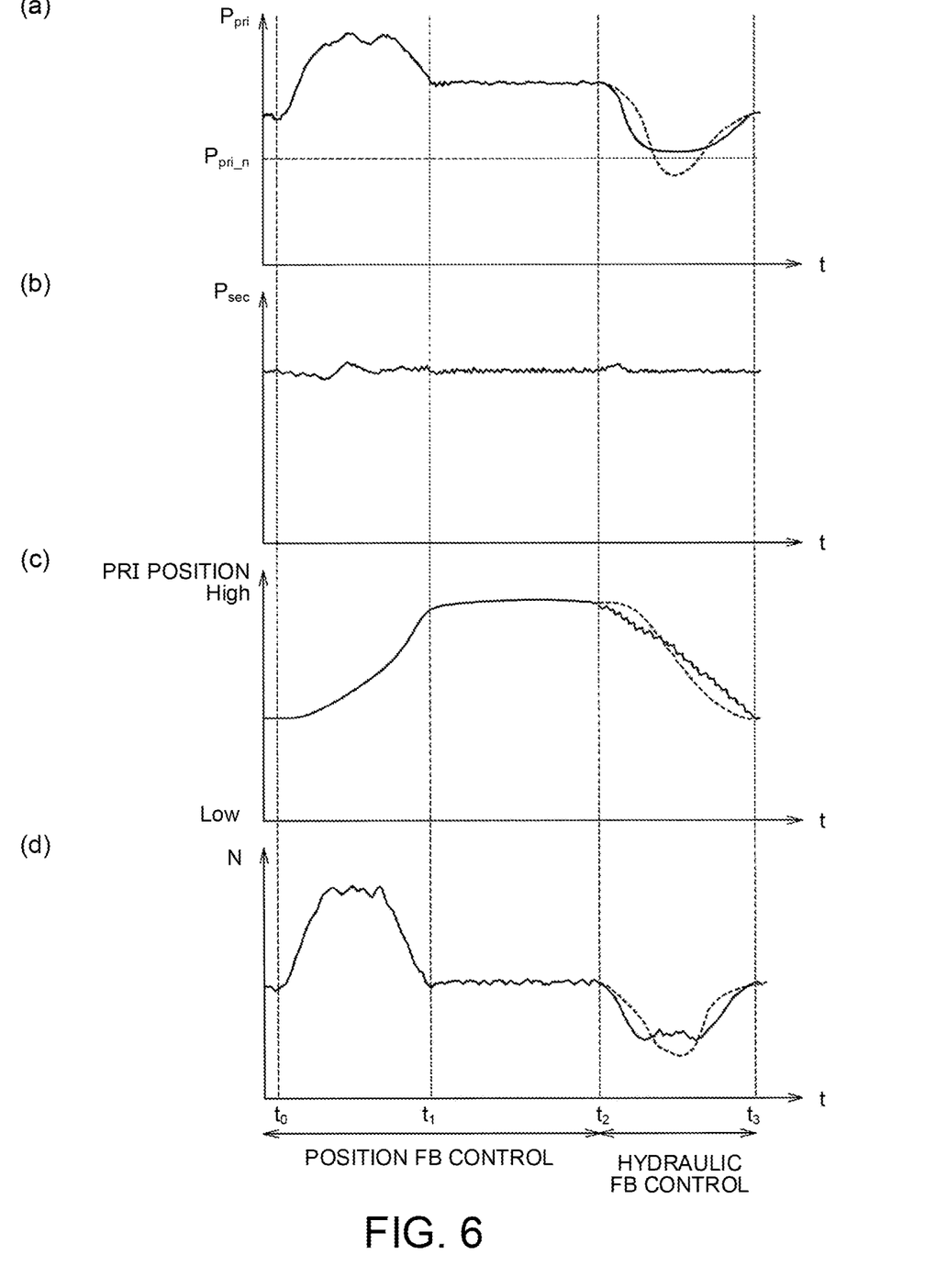
FIG. 6 is a diagram illustrating the states of a continuously variable transmission.

FIG. 6 is a diagram illustrating the states of the continuously variable transmission when the hydraulic control according to the present embodiment is performed.

According to this diagram, in sequence from top, (a) illustrates the PRI pressure Ppri, (b) illustrates the SEC pressure Psec, (c) illustrates the piston position of the PRI pulley 41, and (d) illustrates the rotation speed N of the shift oil pump 122. In addition, (c) illustrates that the upper side of the drawing indicates the piston position at the high side and the lower side of the drawing indicates the piston position at the low side.

The shift state in the continuously variable transmission will be explained. The upshift is performed between a time t0 and a time t1, the shift is not changed and is constant between the time t1 and a time t2, and the downshift is performed between the time t2 and a time t3.

As illustrated in the lower side of the drawing, the position FB control is performed between the time t0 and the time t2. Because the sharp downshift is performed between the time t2 and the time t3, the hydraulic FB control is performed. In addition, in (a), (b), and (d), the PRI pressure, the PRI position, and the rotation speed assuming that the position FB control is performed between the time t2 and the time t3 are illustrated by dotted lines.

First, an operation in a zone from the time t0 to the time t2 will be explained.

As illustrated in (c), because the position FB control is performed, the PRI position is controlled to follow a target value. Referring to (a), because the PRI pressure Ppri is increased while the upshift is being performed, the PRI pressure does not fall below the required PRI pressure Ppri_n. For that reason, there is no possibility of the belt slip. In addition, as illustrated in (b), because the SEC pressure Psec in the present embodiment is controlled to become a target SEC pressure (anti-slip hydraulic pressure) at which the belt slip does not occur, the SEC pressure is substantially constant regardless of the state of the PRI pulley 41. In (d), there is illustrated a state where the rotation speed N of the shift oil pump 122 is controlled to be the PRI position illustrated in (c).

Next, an operation in a zone from the time t2 to the time t3 will be explained.

According to (a), the PRI pressure Ppri is controlled not to fall below the required PRI pressure Ppri_n by the hydraulic FB control. Because the control based on the PRI pressure will not be performed when the position FB control is temporarily performed as illustrated by the dotted line, the belt slip may occur when the PRI pressure Ppri falls below the required PRI pressure Ppri_n.

Referring to (b), similarly to the case where the position FB control is performed, the SEC pressure Psec is the target SEC pressure (anti-slip hydraulic pressure). According to (c), as compared to the case where the position FB control indicated by the dotted line is performed, the change rate of the PRI position becomes smooth.

As described above, because the control can be performed so that the PRI pressure Ppri always exceeds the required PRI pressure Ppri_n by switching to the hydraulic FB control during the downshift, the occurrence of the belt slip can be suppressed.

In addition, in Step S2, the position FB control is not performed and the hydraulic FB control is performed. However, the present embodiment is not limited to the above. The similar effect can be obtained by simply performing the hydraulic FB control.

Moreover, the controller 10 may be configured to perform the determination step of Step S2 and the setting of Steps S3 and S4.

In addition, in Step S2 in the present embodiment, only the hydraulic FB control is performed by the hydraulic control unit 302, namely, the weighting of the hydraulic FB control is increased, and further the position FB control is not performed by the position control unit 301, namely, the weighting of the position FB control is decreased. On the other hand, in Step S3, only the position FB control is performed by the position control unit 301, namely, the weighting of the position FB control is increased, and further the hydraulic FB control is not performed by the hydraulic control unit 302, namely, the weighting of the hydraulic FB control is decreased. Therefore, in the present embodiment, the weighting of the hydraulic FB control in the hydraulic control unit 302 is increased (S2) when the sharp downshift is performed (S1: Yes), and the weighting of the position FB control in the position control unit 301 is increased (S3) other than when the sharp downshift is performed (S1: No).

According to the present embodiment, the following effects can be obtained.

The method for controlling the continuously variable transmission according to the first embodiment includes the determination step (S1) of determining whether the downshift speed is faster than the allowable value. When the downshift speed is slower than the allowable value, the setting is performed so that the position feedback control is performed (S3). In addition, according to the position feedback control, the shift oil pump 122 is controlled based on the piston position. On the other hand, when the downshift speed is faster than the allowable value, the setting is performed so that the hydraulic feedback control is performed (S2). In the hydraulic feedback control, the shift oil pump 122 is controlled based on the PRI pressure Ppri.

Herein, the position feedback control can perform more precise shift control because the speed ratio itself is controlled as compared to the hydraulic feedback control. However, when the downshift speed is faster than the allowable value, the moving speed of the movable pulley 41b becomes fast because the PRI pressure is not controlled and thus the PRI pressure Ppri may fall below the required PRI pressure Ppri_n. In other words, a second thrust to be transmitted from the secondary pulley 42 via the spring mass exceeds a first thrust due to oil in the PRI pulley 41, and thus the belt slip may occur because the movable pulley 41b of the PRI pulley 41 moves in the downshift direction.

Therefore, when the downshift speed is faster than the allowable value (S1: Yes), the PRI pressure itself will be controlled by performing the hydraulic feedback control (S2). For that reason, because the control can be performed so that the PRI pressure Ppri does not fall below the required PRI pressure Ppri_n, the occurrence of the belt slip can be suppressed.

According to the method for controlling the continuously variable transmission of the first embodiment, when the sharp downshift is performed (S1: Yes), the switching is performed so that the hydraulic FB control is performed by the hydraulic control unit 302 and the position FB control is not performed by the position control unit 301 (S2). Moreover, other than when the sharp downshift is performed (S1: No), the switching is performed so that the position FB control is performed by the position control unit 301 and the hydraulic FB control is not performed by the hydraulic control unit 302 (S3).

By doing so, the hydraulic FB control based on the PRI pressure Ppri is performed during the downshift. For that reason, because the control can be performed so that the PRI pressure Ppri exceeds the required PRI pressure Ppri_n, the occurrence of the belt slip can be suppressed.

Moreover, according to the method for controlling the continuously variable transmission of the first embodiment, when the target PRI pressure Ppri* falls below the required PRI pressure Ppri_n (S42: Yes), the controller 10 determines that the belt slip may occur. Then, the controller 10 sets the required PRI pressure Ppri_n as the target PRI pressure Ppri* (S44).

By doing like this, the decrease in the downshift speed can be minimized by suppressing the reduction of the PRI pressure while preventing the belt slip. In other words, it is possible to realize both the prevention of belt slip and the ensuring of the downshift speed.

Second Embodiment

The operation for switching between the hydraulic FB control and the position FB control has been explained in the first embodiment. However, the present invention is not limited to the above. In the present embodiment, an example in which the hydraulic FB control and the position FB control are weighted and performed will be explained.

Figure 7:
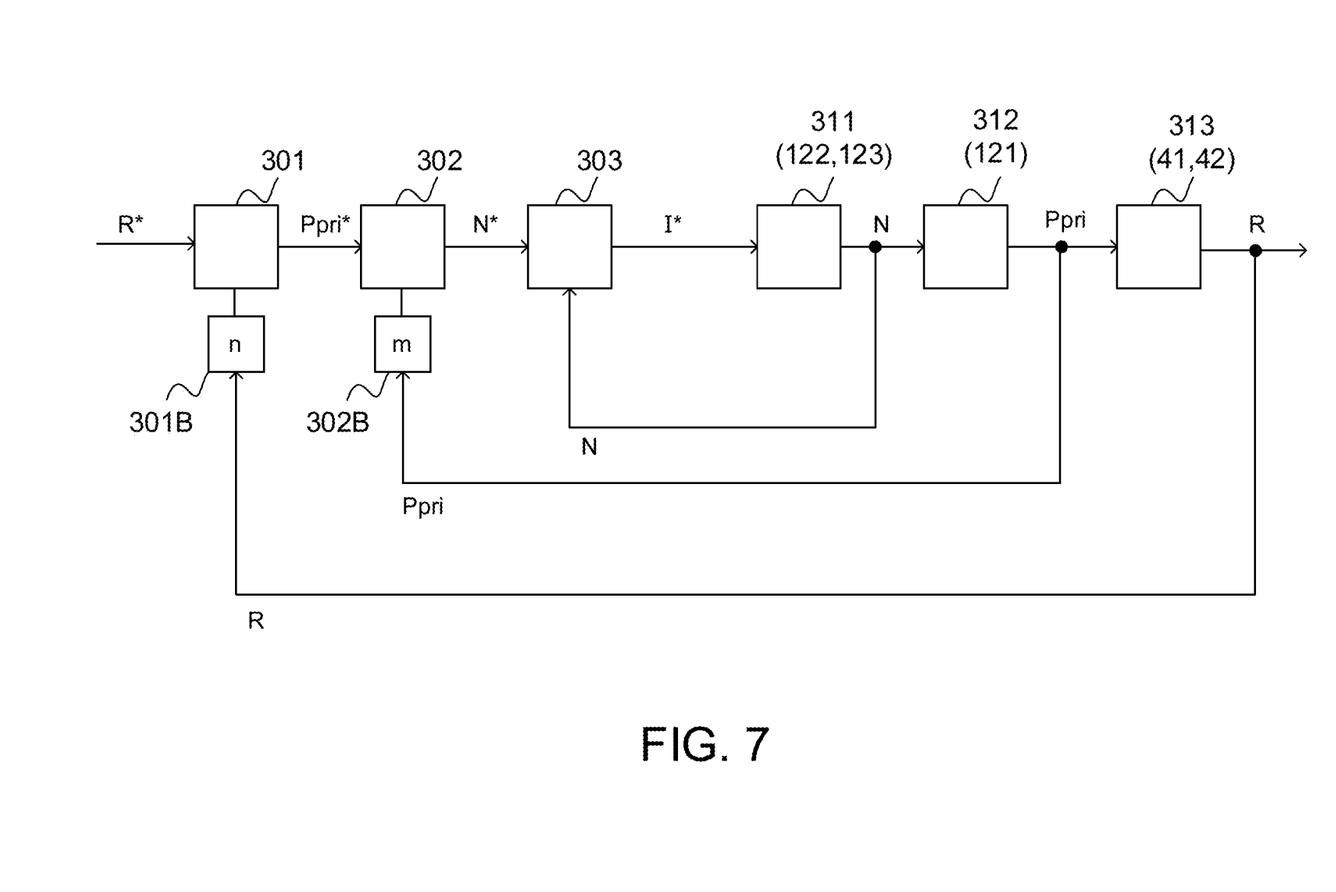
FIG. 7 is a block diagram illustrating the control of an electric motor according to a second embodiment.

FIG. 7 is a block diagram illustrating the second embodiment. As compared to the block diagram of the first embodiment illustrated in FIG. 3, the switches 301A and 302A are deleted and gain blocks 301B and 302B are alternatively provided. A gain n in the gain block 301B and a gain m in the gain block 302B are controlled by the controller 10.

The position control unit 301 determines the weighting of the hydraulic FB control for the entire of the hydraulic control in accordance with the gain n. Moreover, the hydraulic control unit 302 determines the weighting of the position FB control for the entire of the position control in accordance with the gain m.

Figure 8:
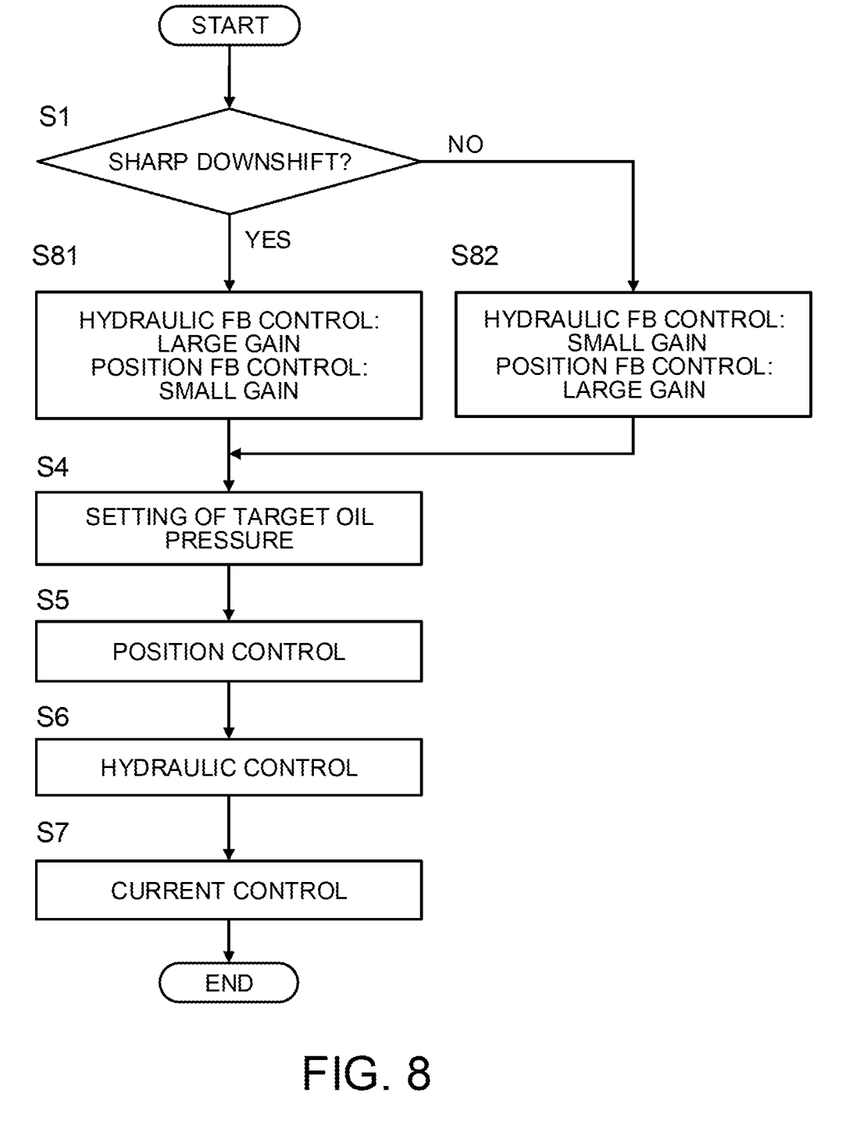
FIG. 8 is a flowchart illustrating a hydraulic control.

FIG. 8 is a diagram illustrating the hydraulic control according to the present embodiment.

According to this drawing, as compared to the hydraulic control of the first embodiment illustrated in FIG. 4, Step S81 is added in substitution for Step S2 and Step S82 is added in substitution for Step S3.

In Step S81, the gain m for the hydraulic FB control is set to a comparatively large value and the gain n for the position FB control is set to a comparatively small value.

In Step S82, the gain m for the hydraulic FB control is set to a comparatively small value and the gain n for the position FB control is set to a comparatively large value.

Even in this way, when the downshift is performed (S2: Yes), the weighting of the hydraulic FB control is increased and a proportion of the control based on the PRI pressure Ppri is increased. For that reason, because the possibility that the PRI pressure Ppri falls below the required PRI pressure Ppri_n can be reduced, the occurrence of the belt slip can be suppressed.

In addition, in the present embodiment, an example in which the gain blocks 301B and 302B are provided and the gains according to these feedback inputs are changed has been explained. However, the present embodiment is not limited to the above. For example, the PID control may be performed by the position control unit 301 and the hydraulic control unit 302 to change coefficients for feedback in these control blocks.

Moreover, the change widths of the gains n and m may be changed in accordance with the operating state. For example, when the downshift speed is faster, the gain m for the hydraulic FB control may be more increased.

According to the present embodiment, the following effects can be obtained.

According to the method for controlling the continuously variable transmission of the second embodiment, a degree of freedom to set the weighting of the hydraulic feedback control and the position feedback control can be improved by using the gain blocks 301B and 302B. For that reason, for example, the weight of the hydraulic feedback control can be increased when a shift speed is extremely fast.

As described above, the embodiments of the present invention have been explained, but the above embodiments are only a part of the application example of the present invention and the technical scope of the present invention is not intended to be limited to the specific configurations of the above embodiments.

The invention claimed is:

1. A method for controlling a continuously variable transmission, the method controlling in/out of oil to/from a primary oil chamber by using an oil pump provided in an oil passage between the primary oil chamber and a secondary oil chamber, the method comprising:
    determining whether a required downshift speed is faster than an allowable value;
    setting a target piston position of the primary oil chamber in accordance with an operating state of a vehicle and performing a position control of a piston of the primary oil chamber based on the target piston position;
    setting a target oil pressure of the primary oil chamber in accordance with the operating state and performing a hydraulic control of the primary oil chamber based on the target oil pressure; and
    increasing weighting of a position feedback control based on the target piston position in the setting of the target piston position when it is determined that the downshift speed is slower than the allowable value and increasing weighting of a hydraulic feedback control based on the target oil pressure in the setting of the target oil pressure when it is determined that the downshift speed is faster than the allowable value.

2. The method for controlling the continuously variable transmission according to claim 1, wherein
    upon determining that the downshift speed is slower than the allowable value, the position feedback control is performed in the setting of the target piston position and the hydraulic feedback control is not performed in the setting of the target oil pressure, and
    upon determining that the downshift speed is faster than the allowable value, the position feedback control is not performed in the setting of the target piston position and the hydraulic feedback control is performed in the setting of the target oil pressure.

3. The method for controlling the continuously variable transmission according to claim 1, wherein
    upon determining that the downshift speed is slower than the allowable value, the weighting of the position feedback control is increased in the setting of the target piston position and the weighting of the hydraulic feedback control is decreased in the setting of the target oil pressure, and upon determining that the downshift speed is faster than the allowable value, the weighting of the position feedback control is decreased in the setting of the target piston position and the weighting of the hydraulic feedback control is increased in the setting of the target oil pressure.

4. The method for controlling the continuously variable transmission according to claim 1, wherein upon the target oil pressure falling below a lower limit pressure required to suppress belt slip in the hydraulic feedback control, the lower limit pressure is set as the target oil pressure.

5. A continuously variable transmission system including a primary oil chamber, a secondary oil chamber, an oil pump provided in an oil passage between the primary oil chamber and the secondary oil chamber and configured to control in/out of oil to/from the primary oil chamber, and a controller, wherein the controller is programmed to:

set a target piston position of the primary oil chamber in accordance with an operating state of a vehicle and perform a position control of a piston of the primary oil chamber based on the target piston position;

set a target oil pressure of the primary oil chamber in accordance with the operating state and perform a hydraulic control of the primary oil chamber based on the target oil pressure;

determine whether a required downshift speed is faster than an allowable value; and increase a weighting of a position feedback control based on the target piston position set when it is determined that the downshift speed is slower than the allowable value and increase a weighting of a hydraulic feedback control based on the target oil pressure set when it is determined that the downshift speed is faster than the allowable value.

* * * * *